United States Patent
Ishibashi

(10) Patent No.: US 9,644,677 B2
(45) Date of Patent: May 9, 2017

(54) PRELIMINARY RETAINER FOR RADIAL NEEDLE BEARING

(71) Applicant: NSK LTD., Tokyo (JP)

(72) Inventor: Yutaka Ishibashi, Gunma (JP)

(73) Assignee: NSK Ltd. (JP)

( * ) Notice: Subject to any disclaimer, the term of this patent is extended or adjusted under 35 U.S.C. 154(b) by 98 days.

(21) Appl. No.: 14/771,612

(22) PCT Filed: Feb. 27, 2014

(86) PCT No.: PCT/JP2014/054885
§ 371 (c)(1),
(2) Date: Aug. 31, 2015

(87) PCT Pub. No.: WO2014/133082
PCT Pub. Date: Sep. 4, 2014

(65) Prior Publication Data
US 2016/0010689 A1    Jan. 14, 2016

(30) Foreign Application Priority Data
Mar. 1, 2013    (JP) .................................. 2013-040385

(51) Int. Cl.
*F16C 33/46*    (2006.01)
*F16C 19/46*    (2006.01)
(Continued)

(52) U.S. Cl.
CPC ........ *F16C 33/4694* (2013.01); *F16C 19/463* (2013.01); *F16C 33/516* (2013.01);
(Continued)

(58) Field of Classification Search
CPC .............................. F16C 33/516; F16C 43/065
See application file for complete search history.

(56) References Cited

U.S. PATENT DOCUMENTS

| | | | |
|---|---|---|---|
| 7,229,215 B2 * | 6/2007 | Kotani | ................... F16C 19/463 384/572 |
| 8,740,470 B2 * | 6/2014 | Ishibashi | ............. F16C 33/4635 384/572 |
| 2004/0156571 A1 | 8/2004 | Kotani | |

FOREIGN PATENT DOCUMENTS

| | | |
|---|---|---|
| DE | 4222184 | 1/1994 |
| JP | 04-078322 | 3/1992 |
| JP | 2009-085401 | 4/2009 |

OTHER PUBLICATIONS

Microfilm of the specification and drawings annexed to the request of Japanese Utility Model. Application No. 011158/1986 (Laid-open No. 122921/1987); Koyo Seiko Co., Ltd.), Aug. 4, 1987; p. 2, line 8 to p. 14, line 3; fig. 1 to 5 (Family: none).

(Continued)

Primary Examiner — Thomas R. Hannon
(74) *Attorney, Agent, or Firm* — Hartman Global IP Law; Gary M. Hartman; Domenica N. S. Hartman

(57) ABSTRACT

The occurrence of wear during use in areas of contact between residual protrusions 22a and opposing end surfaces due to residual protrusions 22a that remain on end surfaces in the circumferential direction of retainer elements 15b after shearing of small cross-sectional area sections is prevented. Convex sections 23, the tip ends thereof being flat, are provided on one end surface in the circumferential direction of retainer elements 15 so as to protrude in the circumferential direction. The arrangement, shape and dimensions of the small cross-sectional area sections 17a and the convex sections 23 are regulated so that when the retainer elements 15b are aligned with each other in the axial direction, and the tip-end sections of the convex sections 23 come in contact with the other end surfaces in the circumferential direction of the retainer elements 15b, spaces 24 in the circumferential direction exist between the tip-end sec- (Continued)

tions of the residual protrusions 22a and the end surfaces in the circumferential direction of the retainer elements 15b.

3 Claims, 11 Drawing Sheets

(51) Int. Cl.
    *F16C 33/51*     (2006.01)
    *F16C 43/06*     (2006.01)

(52) U.S. Cl.
    CPC ........ *F16C 43/065* (2013.01); *F16C 33/4635* (2013.01); *F16C 43/06* (2013.01); *F16C 2361/61* (2013.01); *F16C 2361/65* (2013.01)

(56) References Cited

OTHER PUBLICATIONS

Microfilm of the specification and drawings annexed to the request of Japanese Utility Model Application No. 197718/1984 (Laid-open No. 109917/1986); (Koyo Seiko Co., Ltd.), Jul. 11, 1986; p. 9, line 2 to p. 14, line 7; fig. 1 to 8 (Family: None).
International Search Report, PCT/JP2014/054885, dated May 19, 2014.
European Extended Search Report dated Sep. 2, 2016.

* cited by examiner

PRELIMINARY RETAINER FOR RADIAL NEEDLE BEARING

TECHNICAL FIELD

The present invention relates to a preliminary retainer for a radial needle bearing that is used when assembling a radial needle bearing that is assembled in a rotating mechanical apparatus such as a manual transmission for an automobile, and that forms a split retainer after assembly.

BACKGROUND ART

As illustrated in FIG. 9, in a manual transmission for an automobile (including an automated sequential MT that is based on a manual transmission), a transmission gear 1 is rotatably supported by a radial needle bearing 3 around a power transmission shaft 2 (for example, refer to JP 2009-085401 (A)). The radial needle bearing 3 is rotatably provided between a cylindrical outer raceway 4 that is provided around the inner-circumferential surface of the transmission gear 1 and a cylindrical inner raceway 5 that is provided around the outer-circumferential surface of the power transmission shaft 2 with plural needles 6 held by a cylindrical shaped retainer 7 (7a). Engaging teeth 8 for forming a synchronizing mechanism are provided on the side of the transmission gear 1.

A single-piece retainer 7 as illustrated in FIG. 10, or a split retainer 7a as illustrated in FIG. 11 is assembled in the radial needle bearing 3. In either construction, the retainer 7 (7a) is constructed by plural column sections 10 that are spaced around in the circumferential direction and that span between a pair of concentric rim sections 9 that are separated in the axial direction. The spaces that are surrounded on four sides by column sections 10 that are adjacent in the circumferential direction and the rim sections 9 function as pockets 11 for holding the needles 6 so as to rotate freely. As necessary, construction is used in which notch shaped concave sections 12 (see FIG. 9) are provided on the outer end edge section of the rim sections 9 so that it is possible to feed lubricant that is supplied to the inner-diameter side of the retainer 7 (7a) to the outer-diameter side.

In the example in the figure, the transmission gear 1 is located between a stepped section 13 that is formed around the outer-circumferential surface of the power transmission shaft 2 and a synchronizing hub 14 that is fitted with a spline fit with the outer-circumferential surface of the power transmission shaft 2. The synchronizing hub 14 and the engaging teeth 8 form a synchronizing mechanism. When the synchronizing mechanism is disengaged, the transmission gear 1 and the power transmission shaft 2 freely rotate relative to each other, and the transmission gear 1 is in a state that does not contribute to power transmission. On the other hand, when the synchronizing mechanism is engaged, the transmission gear 1 and the power transmission shaft 2 rotate in synchronization, and the transmission gear 1 is in a state that contributes to power transmission. The construction and function of this kind of synchronizing mechanism is conventionally known, and are not related to the scope of the present invention, so a detailed explanation thereof is omitted.

In the case of the retainer that is assembled in the radial needle bearing 3 for a manual transmission for an automobile, using a retainer 7a having a split structure such as illustrated in FIG. 11 compared with a single piece retainer 7 such as illustrated in FIG. 10 is advantageous from the aspect of preventing fretting. A split retainer 7a is constructed by the edges on both ends in the circumferential direction of plural partial cylindrical shaped retainer elements 15 coming in contact with each other or facing each very close. In the example in the figure, the split retainer 7a has a pair of semi-cylindrical retainer elements 15. The retainer 7a is assembled between the outer raceway 4 and inner raceway 5 together with the needles 6, and in a state in which the radial needle bearing 3 is formed, the retainer elements 15 are combined into a cylindrical shape.

The reason that a split retainer 7a is advantageous from the aspect of preventing fretting is that in the case of a split retainer 7a, the retainer element 15 that is in a no-load area are able to be displaced in the circumferential direction an amount equal to the space in the circumferential direction located between the above retainer element 15 and the retainer element 15 that is in a load area, is displaced a little at a time in the circumferential direction due to inertia or vibration caused by rotation. Due to this displacement, the rolling surfaces of the needles held by the retainer elements 15 that are in a no-load area are displaced relative to the outer raceway 4 and inner raceway 5. The split retainer 7a is such that there is this kind of relative displacement, so from the aspect of preventing fretting, it is more advantageous than a single-piece retainer 7 as illustrated in FIG. 10.

JP 2009-085401 (A) discloses an assembly method for assembling a split retainer 7a in a manual transmission for an automobile. In this assembly method, a preliminary retainer 16 as illustrated in FIG. 12 is used. The preliminary retainer 16 has a pair of retainer elements 15a that are formed by injection molding using synthetic resin. Moreover, as illustrated in FIG. 12 and FIG. 13A, the retainer elements 15a are arranged in a shifted state in the axial direction, and plural locations each on the edges of both ends in the circumferential direction of the retainer elements 15a (two locations each in the example in the figures) are connected by small cross-sectional area sections 17. The retainer elements 15a each have a partial cylindrical shape, and have partial arc-shaped raw rim sections 18 that are provided on both ends in the axial direction, and plural column sections 10 that span between the raw rim sections 18. The portions that are surrounded on four sides by column sections 10 that are adjacent in the circumferential direction, and the raw rim sections 18 function as pockets 11 for holding the needles 6 so as to rotate freely.

Each of the small cross-sectional area sections 17 is constructed so that the cross-sectional area is small, and so that when the retainer elements 15a is displaced relative to each other in the axial direction and a force acts in the shear direction, shearing occurs easily. Shear guide sections 20 where the cross-sectional area of the small cross-sectional area sections 17 becomes a minimum are provided in the center positions in the lengthwise direction of the small cross-sectional area sections 17, or in other words, in the center positions in the circumferential direction of the spaces 19 that exist between the edges on both ends in the circumferential direction of the pair of retainer elements 15a.

As illustrated in FIG. 13A and FIG. 13B, when using a preliminary retainer 16 to assemble the radial needle bearing 3 around the power transmission shaft 2a of the manual transmission for an automobile, first, the needles 6 (see FIG. 9) are held inside the pockets of the retainer elements 15a of the preliminary retainer 16. With the needles 6 held inside the pockets 11, the needles 6 are prevented from coming out from the pockets 11 by stoppers (not illustrated in the figures). With this kind of construction, the preliminary retainer 16 and needles 6 can be handled as a non-divided member. As illustrated in FIG. 13A, the preliminary retainer 16 with needles 6 held inside the pockets 11 is fitted around the outside of the portion of the power transmission shaft 2*a* that is adjacent to the stepped section 13*a*. It is also possible to assemble the needles 6 so as to be held inside the pockets 11 after the preliminary retainer 16 has been fitted around this portion.

Next, the transmission gear 1*a* is fitted around the outside of the preliminary retainer 16 and needles 6, and the components of a synchronizing mechanism such as a synchronizing hub 14*a*, synchronizer rings 21*a*, 21*b* and the like are fitted around the outside of the preliminary retainer 16 and transmission gear 1*a* on the portion on the opposite side in the axial direction from the stepped section 13*a*. Then, as illustrated in FIG. 13B, these components 14*a*, 21*a*, 21*b* and the stepped section 13*a* are brought close together. As a result, the preliminary retainer 16 is pressed on both sides in the axial direction by the stepped section 13*a* and synchronizing hub 14*a*, and the small cross-sectional area sections 17 shear at the shear guide sections 20. The preliminary retainer 16 is divided into the retainer elements 15*a* that are independent from each other, and the phases in the axial direction (left and right direction in FIG. 13B) of these retainer elements 15*a* coincide. When the small cross-sectional area sections 17 shear, residual protrusions 22 remain on the end surfaces in the circumferential direction of the retainer elements 15*a*.

By using a preliminary retainer 16, it is possible to easily perform assembly of a radial bearing that uses a split retainer 7*b*. Moreover, after assembly, the preliminary retainer 16 forms the split retainer 7*b*, so when in use, it is possible for there to be relative displacement between the rolling surfaces of the needles 6 that are held by the retainer element 15*a* that is located in a no-load area and the outer raceway 4 and inner raceway 5. Therefore, using a preliminary retainer 15 is also advantageous from the aspect of preventing fretting. However, when in use and there is relative displacement in the circumferential direction between retainer elements 15*a*, the tip-end sections of the residual protrusions 22 repeatedly come in contact with the end surfaces in the circumferential direction of the opposing retainer elements 15*a*. The tip-end section of the residual protrusions 22 may be sharp, or have burrs due to the shearing of the small cross-sectional area sections 17, and there is a possibility that localized wear will occur at the areas of contact between the tip-end sections of the residual protrusions 22 and the end surfaces in the circumferential direction of the retainer elements 15*a*. As a result, wear fragments that occur due to this wear may enter into the areas of contact between the rolling surfaces of the needles 6 and the pockets 11 of the retainer 7*a*, and between the rolling surfaces of the needles 6 and the outer raceway 4 and inner raceway 5, which may become the cause of premature flaking of the rolling surfaces of the needles 6, and the outer raceway 4 and inner raceway 5, or may cause a decrease in strength due to a decrease in the cross-sectional thickness of the column sections 10.

RELATED LITERATURE

Patent Literature

[Patent Literature 1] JP 2009-085401 (A)

SUMMARY OF INVENTION

Problem to be Solved by Invention

Taking the situation above into consideration, the object of the present invention is to achieve construction of a preliminary retainer that is able to prevent the occurrence of wear of the end surfaces in the circumferential direction of retainer elements of a split retainer that is caused by residual protrusions during use when a radial needle bearing is assembled using a preliminary retainer that has plural retainer elements that are connected in the circumferential direction by small cross-sectional area sections.

Means for Solving Problems

The preliminary retainer for a radial needle bearing of the present invention is used when assembling a radial needle bearing and comprises plural retainer elements, each having a partial cylindrical shape; in which
  each of the retainer elements comprises:
    a pair of partial arc shaped raw rim sections that are provided on the end sections in the axial direction; plural column sections that span between the pair of raw rim sections; and plural pockets that are formed so as to be surrounded by the pair of raw rim sections and column sections that are adjacent in the circumferential direction and that hold needles so as to roll freely. The preliminary retainer for a radial needle bearing of the present invention is constructed by arranging the retainer elements that are adjacent in the circumferential direction so as to be shifted in the axial direction, and connecting the edges of the end sections in the circumferential direction of the retainer elements that are adjacent in the circumferential direction together by small cross-sectional area sections.

Particularly, in the preliminary retainer for a radial needle bearing of the present invention, shear guide sections having a cross-sectional area that is less than the other portions of the small cross-sectional area sections are provided in part in the circumferential direction of the small cross-sectional area sections; and convex sections that protrude in the circumferential direction, the tip-end surfaces thereof being flat surfaces or smooth curved surfaces, are provided on at least one end surface of the end surfaces that face each other of the retainer elements that are adjacent in the circumferential direction. The small cross-sectional area sections and the convex sections are constructed so that when the small cross-sectional area sections shear at the shear guide sections, the retainer elements become aligned with each other in the axial direction, and the tip-end sections of the convex sections come in contact with portions in the circumferential direction that face the tip-end sections of the convex sections, spaces exist in the circumferential direction between the tip-end sections of residual protrusions that remain on the end surfaces in the circumferential direction of the retainer elements due to shearing of the small cross-sectional area sections and the portions in the circumferential direction that face the tip-end sections of the residual protrusions. More specifically, the small cross-sectional area sections and the convex sections are constructed so that the protruding amounts in the circumferential direction of the convex sections after shearing of the shear guide sections become greater than the larger one of the dimension from one end section of the small cross-sectional area sections to the shear guide sections, and the dimension from the other end section of the small cross-sectional area sections to the shear guide sections. When the convex sections comprise plural elements in the circumferential direction (a pair of convex sections that are provided on both opposing end surfaces of adjacent retainer elements), the total protruding amount in the circumferential direction of the plural elements becomes the protruding amount in the circumferential direction of the convex sections. Moreover, the convex sections can also be provided at plural locations on one end surface or on both end surfaces in the circumferential direction of the retainer elements, for example on both end sections in the axial direction.

Preferably, the shear guide sections are formed in the center in the circumferential direction of the small cross-sectional area sections.

Moreover, preferably, when the small cross-sectional area sections shear at the shear guide sections, the retainer elements become aligned with each other in the axial direction, and the tip-end sections of the convex sections come in contact with portions in the circumferential direction that face the tip-end sections of the convex sections, spaces exist in the axial direction between the convex sections and the residual protrusions on the end surfaces in the circumferential direction of the retainer elements that are on the sides that face the convex sections.

EFFECT OF INVENTION

With the present invention, even when a radial needle bearing is assembled using a preliminary retainer that has plural retainer elements that are connected in the circumferential direction by small cross-sectional area sections, wear during use at areas of contact between residual protrusions, which remain on the end surfaces in the circumferential direction of the retainer elements, and the end surfaces in the circumferential direction of the retainer elements due to the residual protrusions is prevented. In other words, in the preliminary retainer of the present invention, convex sections, the tip-end surfaces thereof being flat or smooth curved surfaces, are provided on the end surfaces of adjacent retainer elements that face each other in the circumferential direction, so during use, when the tip-end sections of the convex sections come in contact with the portions in the circumferential direction that face the tip-end sections of the convex sections, spaces in the circumferential direction exist between the tip-end sections of the residual protrusions that remain on the end surfaces in the circumferential direction of the retainer elements after shearing of the small cross-sectional area sections and portions in the circumferential direction that face the tip-end sections of the residual protrusions. Therefore, during use, even when there is relative displacement in the circumferential direction between retainer elements, the tip-end sections of the residual protrusions do not come in contact with the opposing portions. Consequently, localized wear in the areas of contact does not occur due to the tip-end sections of the residual protrusions coming in contact with the portions that face the tip-end sections of the residual protrusions, and problems such as wear fragments generated by wear entering into the area of contact between the rolling surfaces of the needles and the retainer pockets or into the areas of contact between the rolling surfaces of the needles and the outer raceway and inner raceway, premature flaking of the rolling surfaces of the needles and raceways, a reduction of strength due to a decrease in the cross-sectional thickness of the column sections of the retainer and the like are effectively prevented.

MODES FOR CARRYING OUT INVENTION

First Example

FIG. 1 to FIG. 4B illustrate a first example of an embodiment of the present invention. A feature of the present invention is the construction of a connecting section in the circumferential direction between retainer elements 15b of a preliminary retainer 16a for a radial needle bearing. The construction and function of the other parts of the preliminary retainer 16a are the same as those of conventional construction. Moreover, the construction of a radial needle bearing in which the preliminary retainer 16a of the present invention is assembled, the construction of a rotating mechanical apparatus such as manual transmission for an automobile in which this radial needle bearing is assembled, and the method for assembly in order to assemble the preliminary retainer 16a into a rotating mechanical apparatus are the same as that of conventional technology. Therefore, drawings and explanations of identical parts are simplified, and the following explanation will center on the characteristic parts of the present invention.

Figure 9:
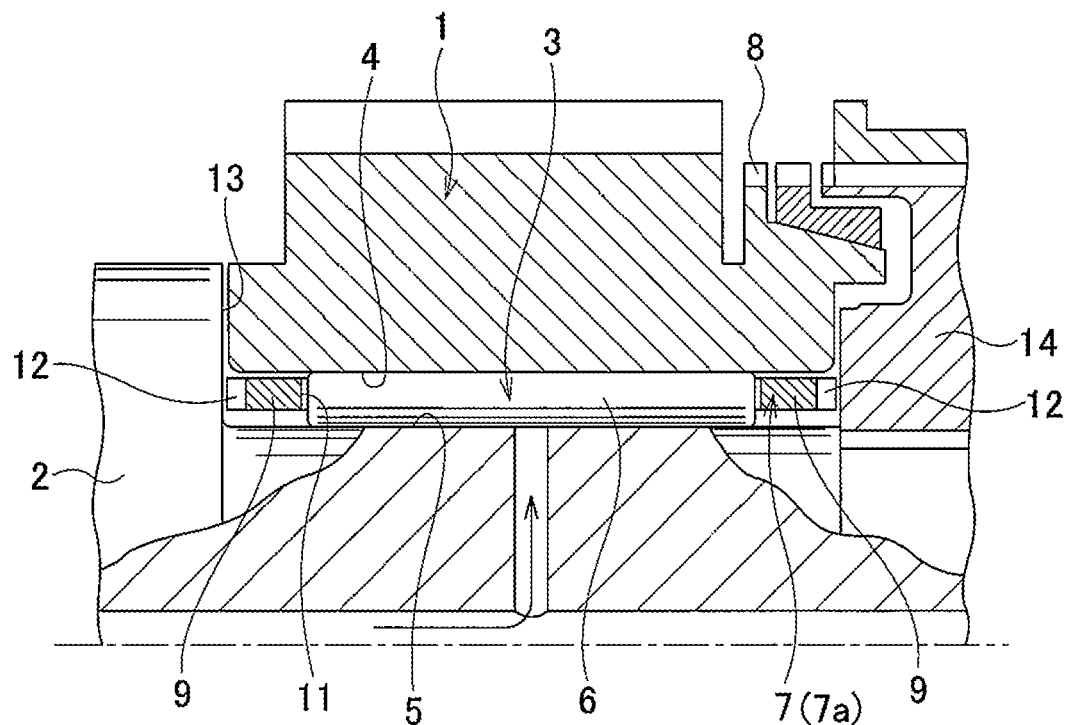
FIG. 9 is a partial cross-sectional view of an example of a manual transmission for an automobile in which a conventional radial need bearing is assembled.
Figure 10:
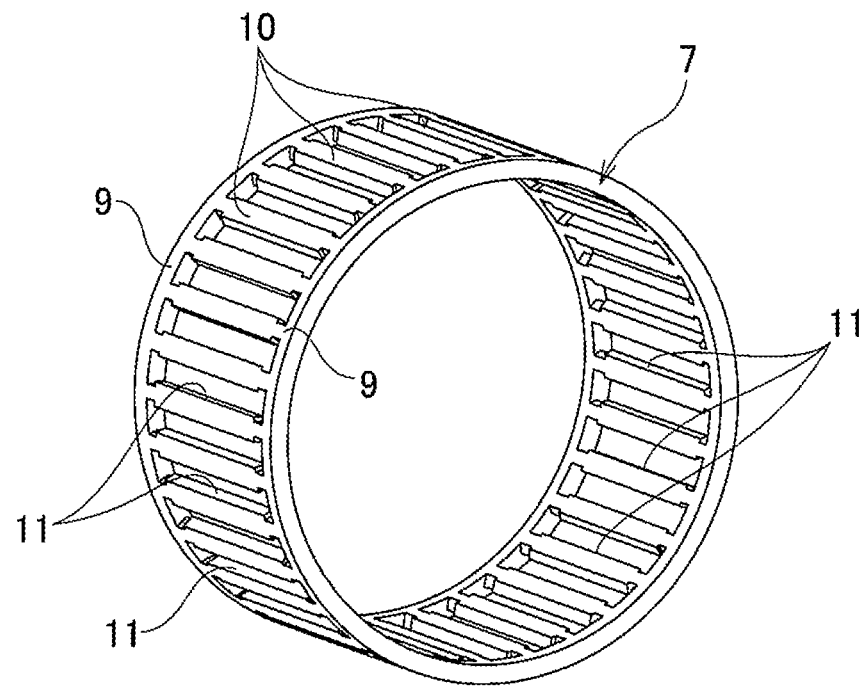
FIG. 10 is a perspective view illustrating an example of a conventional single-piece retainer.
Figure 11:
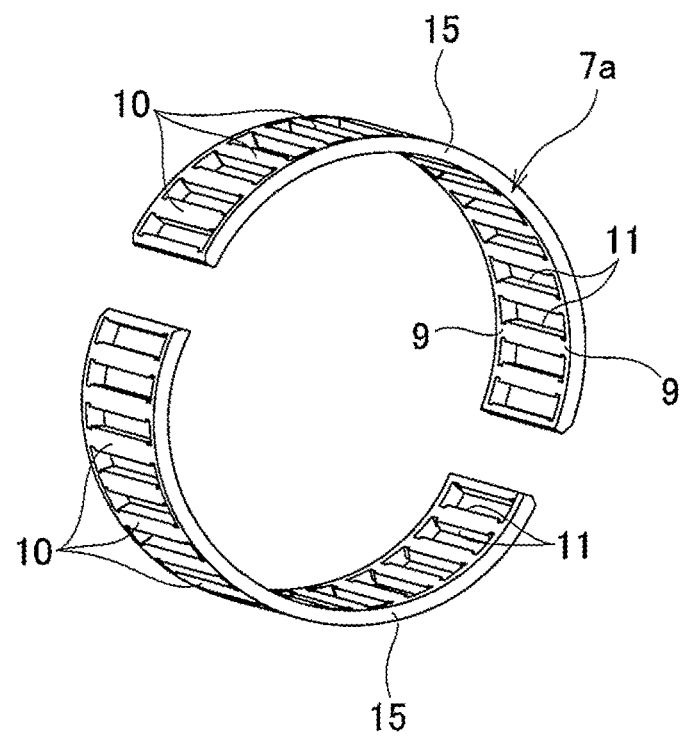
FIG. 11 is a perspective view illustrating an example of a conventional split retainer.
Figure 12:
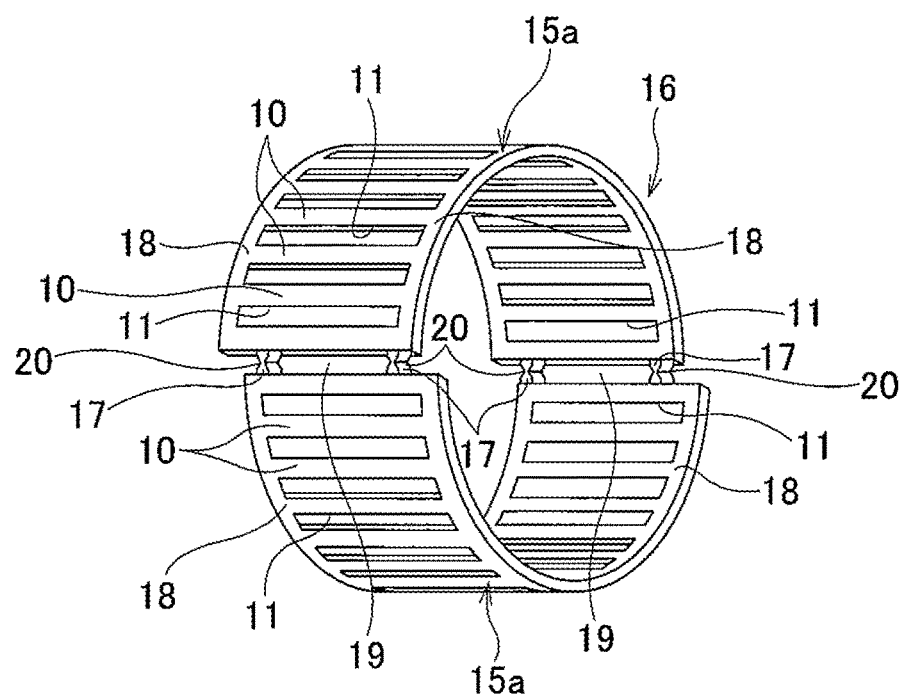
FIG. 12 is a perspective view illustrating an example of a conventional preliminary retainer.
Figure 13:
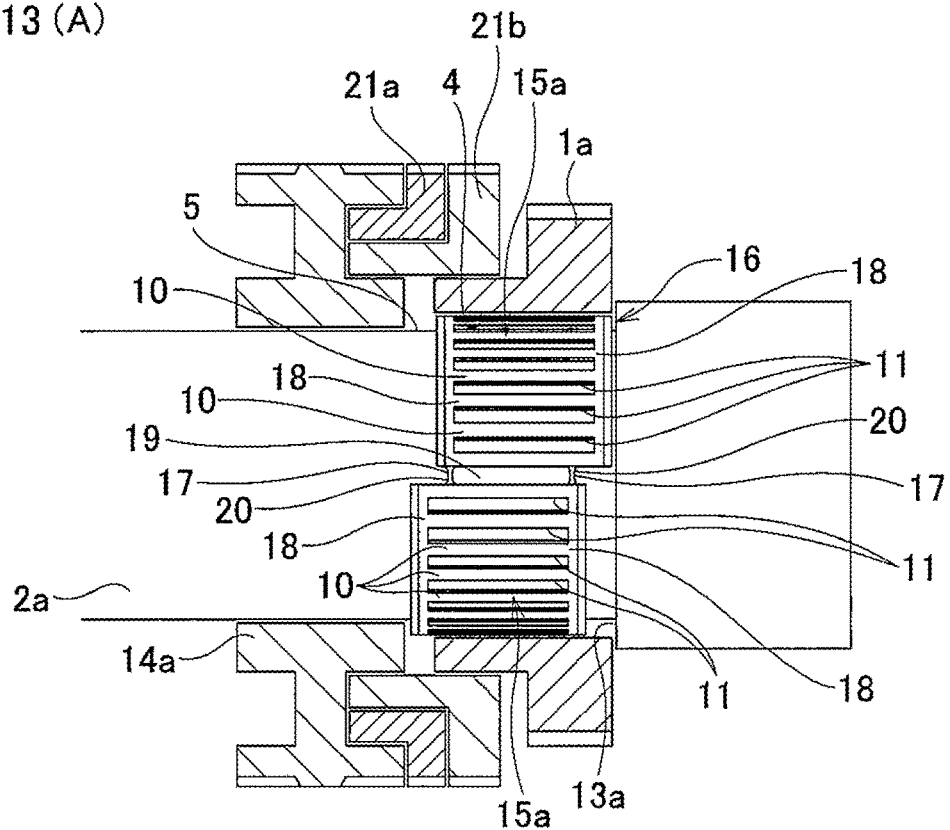
FIG. 13A is a partial cross-sectional view of a manual transmission for an automobile, and illustrates the state of the conventional preliminary retainer in the process of being assembled.
FIG. 13B is a partial cross-sectional view of a manual transmission for an automobile, and illustrates the state after assembly is complete.
Figure 13:
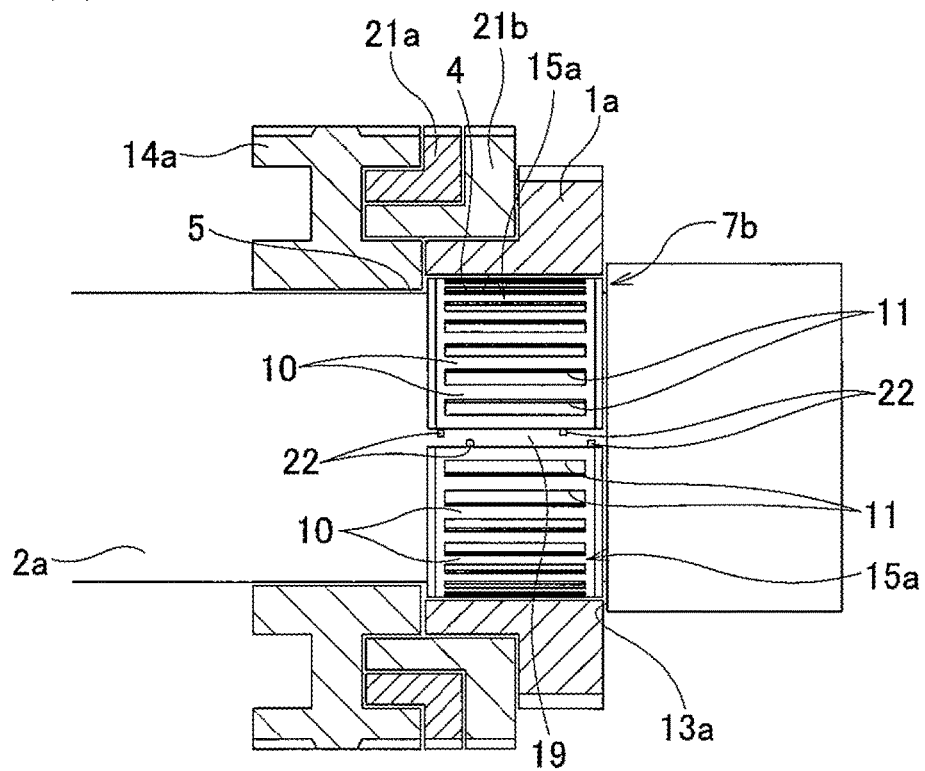

The preliminary retainer 16a of this example has a pair of retainer elements 15b that are formed by injection molding of synthetic resin. These retainer elements 15b are concentric with each other, however, are arranged so as to be shifted in the axial direction, and the edges on both ends in the circumferential direction of the retainer elements 15b are connected with each other by small cross-sectional area sections 17a at plural locations (two locations in the example on the figure). Each retainer element 15b has a partial cylindrical shape and has: a pair of partial arc shaped raw rim sections 18 that are provided on both end sections in the axial direction; plural column sections 10 that span between these raw rim sections 18; and plural pockets that are formed so as to be surrounded on four sides by the pair of raw rim sections 18 and column sections 10 that are adjacent in the circumferential direction and that hold needles 6 (see FIG. 9) so as to roll freely. Taking into consideration low cost, improved performance due to reduced weight, and ease of shearing of the small cross-sectional area sections, the preliminary retainer 16a that constitutes a split retainer during use preferably is made of synthetic resin, however, the present invention can also be applied to a radial needle bearing that has a metal retainer, including a retainer made using a copper alloy such as brass. Moreover, the number of divisions of the split retainer (number of retainer elements 15b) is not limited to two, and it is also possible to use a number of three or more.

Figure 1:
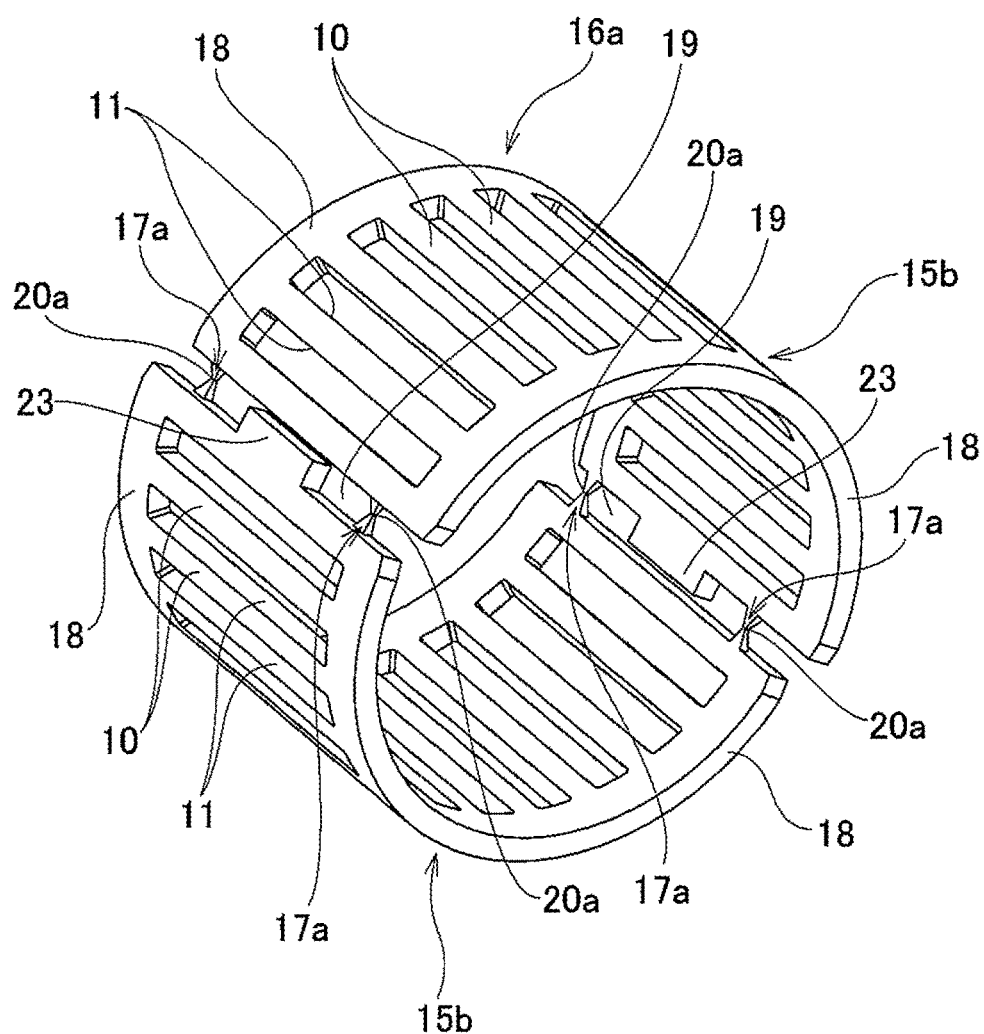
FIG. 1 is a perspective view of a preliminary retainer of a first example of an embodiment of the present invention.
Figure 2:
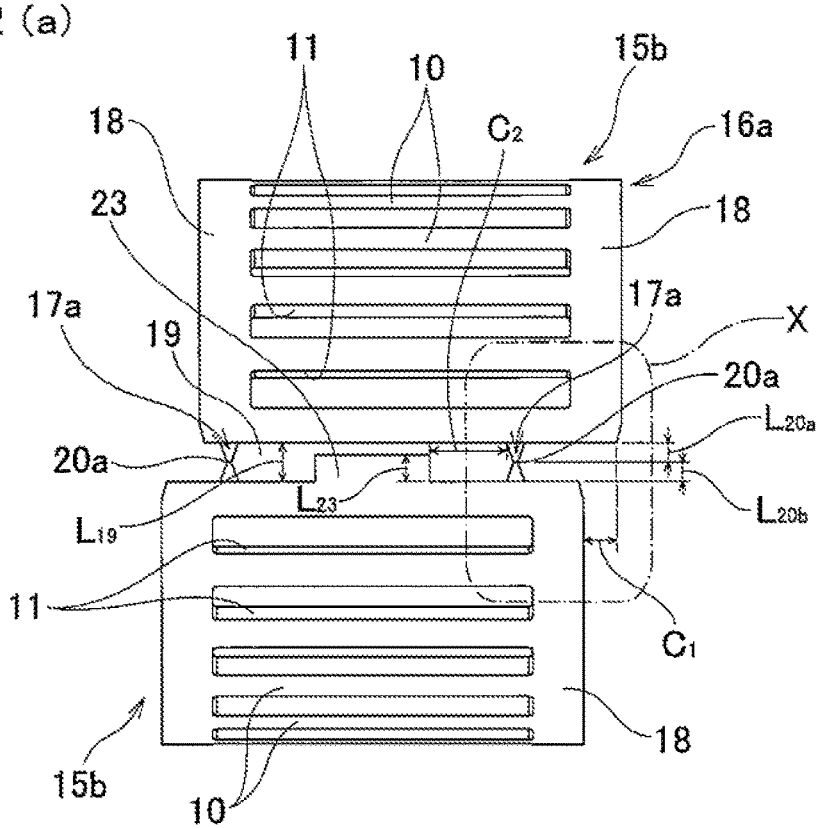
FIGS. 2A and 2B are views as seen from the outside in the radial direction of a connecting section between retainer elements of a preliminary retainer of the first example.
Figure 2:
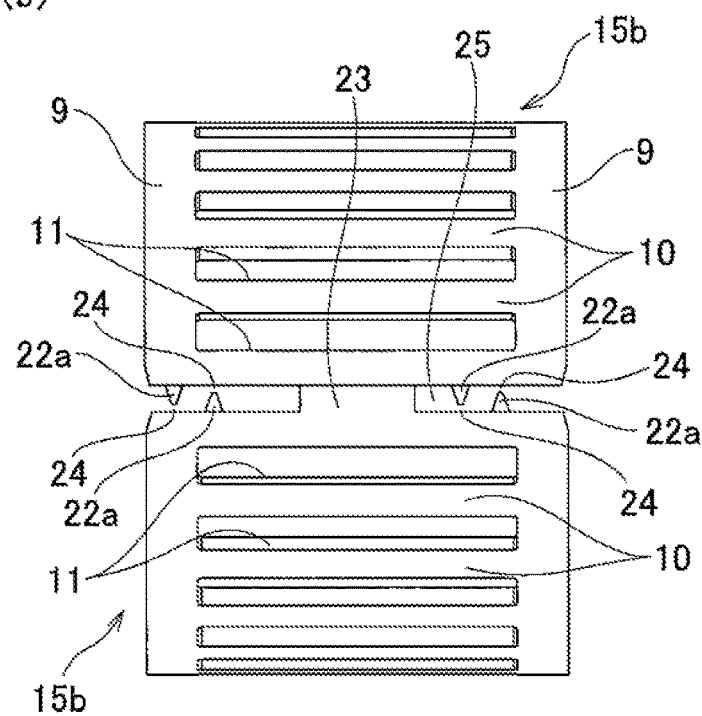
Figure 3:
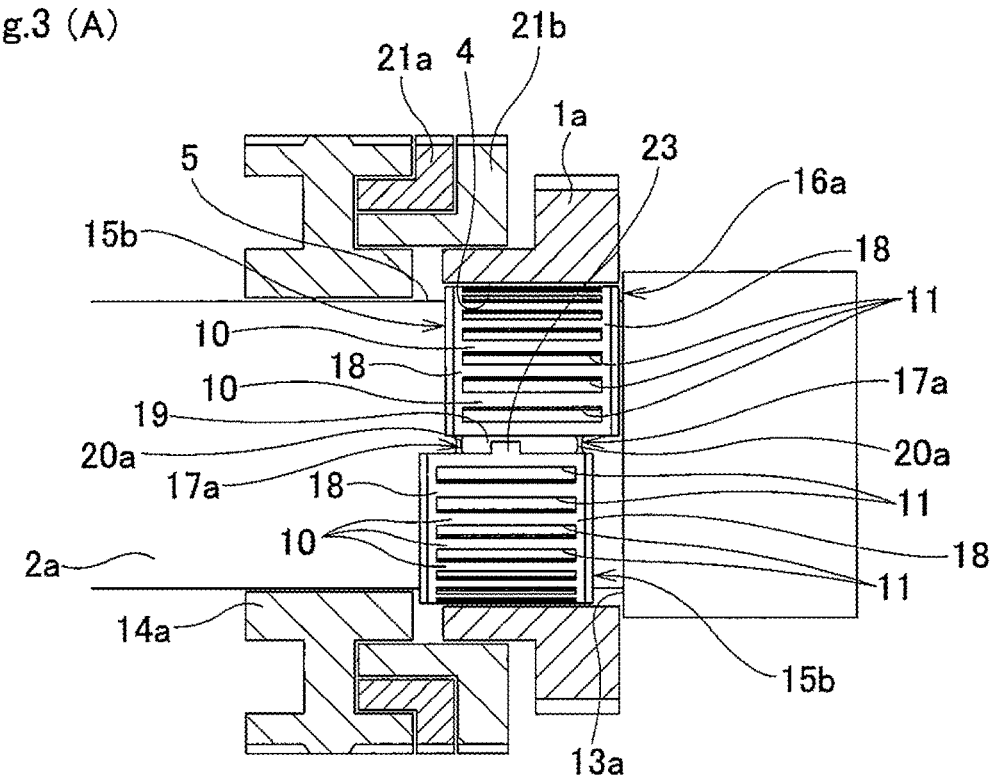
FIG. 3A is a partial cross-sectional view of a manual transmission for an automobile, and illustrates the state of a preliminary retainer of the first example in the process of being assembled.
FIG. 3B is a partial cross-sectional view of a manual transmission for an automobile, and illustrates the state after assembly is complete.
Figure 3:
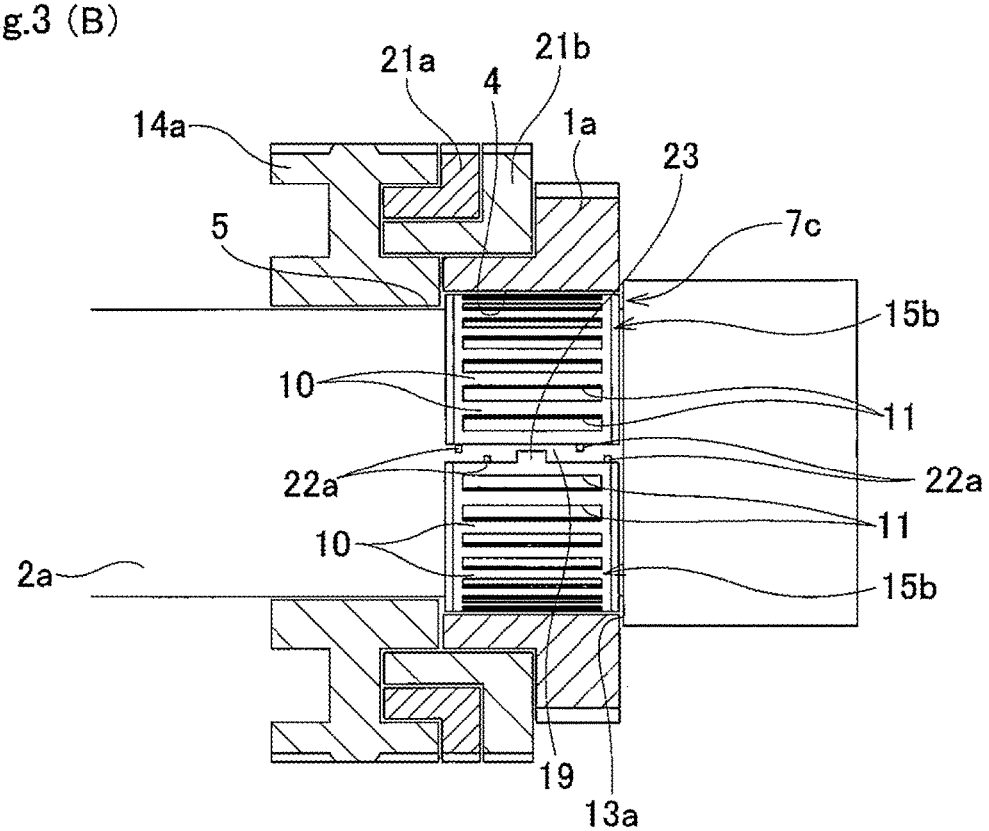
Figure 4:
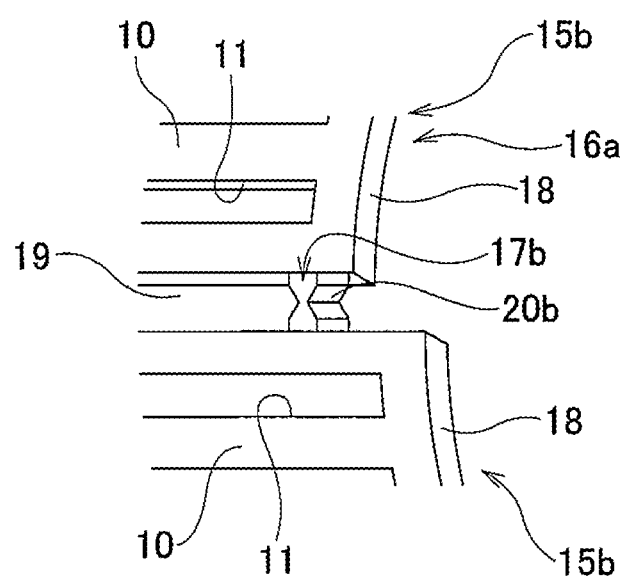
FIG. 4A and FIG. 4B are partial enlarged views of section X in FIGS. 2A and 2B, and illustrate two examples of the form of a small-cross sectional area section that can be applied to a preliminary retainer of the first example.
Figure 4:
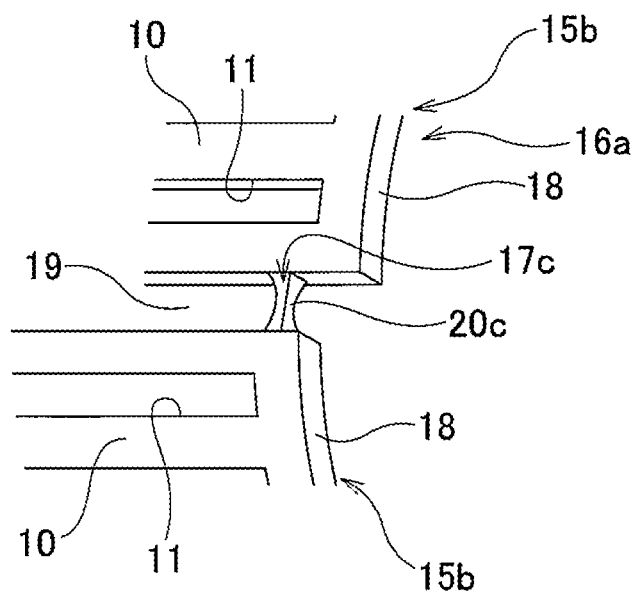

The small cross-sectional area sections 17a have a small cross-sectional area, and can easily shear when a force in the shear direction is applied by relative displacement in the axial direction of the retainer elements 15b. More specifically, the cross-sectional area of the small cross-sectional area sections 17a becomes a minimum at the center location in the lengthwise direction (circumferential direction), and the portion having a cross-sectional area that is smaller than the other portions of the small cross-sectional area section 17a and that shears when a force is applied in the shearing direction, functions as a shear guide 20a. In addition to the shape of the small cross-sectional area section of the small cross-sectional area sections 17a having a shape such that connects the end sections of the small-diameter side of a cone as illustrated in FIG. 1 to FIG. 3, it is possible to use a small cross-sectional area section 17b as illustrated in FIG. 4A in which the shear guide 20b is formed by forming a V-shaped groove in the portion that is aligned with both side surfaces in the axial direction of the center section in the lengthwise direction of the square column, or a small cross-sectional area section 17c in which the center section is narrow and both end sections are comparatively thick, with the portion in the center section where the cross-sectional area is the smallest as the shear guide section 20c. Anyway, as long as the cross-sectional area of the small cross-sectional area sections 17a to 17c is the narrowest in the portions that correspond to the center position in the circumferential direction of the space 19 that exists between the edges of both end sections in the circumferential direction of the retainer elements 15b, it is possible to use any arbitrary shape as the small cross-sectional area sections.

In this example, a convex section 23 that is formed so that the tip end thereof is a flat surface and protrudes in the circumferential direction is provided in the center section in the axial direction of one end surface of both end surfaces in the circumferential direction of each retainer element 15b. The shape of the tip end of this convex section 23 can also be a smooth convex curved surface, and not just a flat surface. When the tip end of the convex section 23 is a convex curved surface, the tip end section of the convex section 23 is preferably such that the radius of curvature of the curved convex section is large from the aspect of making the surface pressure when the tip end section of the convex section 23 is in contact with the opposing portion in the circumferential direction small.

Moreover, in this example, as illustrated in FIG. 2B, when the small cross-sectional area sections 17 shear at the shear guides 20a, the retainer elements 15b are aligned in the axial direction (the phase in the axial direction matches), and the tip-end sections of the convex sections 23 in contact with the portions in the circumferential direction that face the tip-end sections of the convex sections 23 (other end surface of both end surfaces in the circumferential direction of the retainer elements 15b), the dimensions of the small cross-sectional area sections 17a and the convex sections 23 are regulated so that there are spaces 24 that exist in the circumferential direction between the tip-end sections of residual protrusions 22a that remain on the surfaces in the circumferential direction of the retainer element 15b after shearing of the small cross-sectional area sections 17a, and the portions that face the tip-end sections of the residual protrusions 22a in the circumferential direction (end surface in the circumferential direction of the other retainer element 15b).

More specifically, in this example, by taking the amount of protrusion in the circumferential direction of the convex sections 23 to be $L_{23}$ (height), the dimension from one end section of a small cross-sectional area sections 17a to the shear guide sections 20a to be $L_{20a}$, the dimension from the other end section of the small cross-sectional area sections 17a to the shear guide sections 20a to be $L_{20b}$, and the larger of $L_{20a}$ and $L_{20b}$ to be $L_{20}$ (in this example $L_{20}=L_{20a}=L_{20b}$), the dimensions of the small cross-sectional area sections 17a and convex sections 23 are regulated so that the relationship $L_{23}>L_{20}$ is satisfied. When the shear guide sections 20a are not provided in the center in the circumferential direction of the small cross-sectional area sections 17a, the larger dimension of $L_{20a}$ and $L_{20b}$ is taken to be $L_{20}$, and the dimension of the small cross-sectional area sections 17a is regulated according to the relationship with the amount of protrusion $L_{23}$ of the convex sections 23. The amount of protrusion $L_{23}$ of the convex sections 23 is set to be less than the dimension $L_{19}$ in the circumferential direction of the space 19 ($L_{23}<L_{19}$). However, from the aspect of preventing fretting of the areas of contact between the rolling surfaces of the needles 6 and the outer raceway 4 and inner raceway 5, preferably the amount of protrusion $L_{23}$ of the convex sections 23 is made to be less than the dimension $H_{19}$ in the circumferential direction of the space 19 so that it is possible to maintain relative displacement in the circumferential direction of the retainer element 15b.

In the state illustrated in FIG. 2B, a space 25 in the axial direction is provided between the convex section 23 and a residual protrusion 22a on one side (right side in FIG. 2) of the residual protrusions 22a on the end surface in the circumferential direction of the retainer element 15b that faces the convex section 23. More specifically, when the amount of shifting in the axial direction between adjacent retainer elements 15b in the state illustrated in FIG. 2A before the small cross-sectional area sections shear is taken to be $C_1$, and when the space in the axial direction between the convex section 23 in the state illustrated in FIG. 2A, and the residual protrusion 22a on the one side that is displaced in the direction toward the convex section 23 at the time of transferring to the state after shearing of the small cross-sectional area sections 17a illustrated in FIG. 2B is taken to be $C_2$, the size and positions in the axial direction of the small cross-sectional area section 17a on the one side and the convex section 23 are regulated so that the relationship $C_1<C_2$ is satisfied. With this kind of construction, the convex section 23 is prevented from interfering with the residual protrusion 22a on the one side during use.

The work of using the preliminary retainer 16a of this example to assemble a radial needle bearing for supporting a transmission gear 1a around a power transmission shaft 2a of a rotating mechanical device so as to rotate freely can be performed in the same order as a conventional assembly method as illustrated in FIG. 3A and FIG. 3B.

With the preliminary retainer 16a of this example, wear of the end surfaces in the circumferential direction of the retainer elements 15b due to the material of the residual protrusions 22a during use is prevented even when a radial needle bearing is assembled using the preliminary retainer 16a that has a pair of retainer elements 15b that are connected in the circumferential direction by small cross-sectional area sections 17a.

In other words, in this example, convex sections 23, the tip-end surfaces thereof being a flat surface or a convex curved surface, are provided on the end surfaces of opposing retainer elements 15b that are adjacent in the circumferential direction. During use, spaces 24 exist in the circumferential direction between the residual protrusions 22a and the portion that faces the tip-end sections of the residual portions 22a in the circumferential direction in a state in which the tip-end section of the convex section 23 and the portion that faces the tip-end section of the convex section 23 in the circumferential direction are in contact. Therefore, during use, even when there is relative displacement in the circumferential direction of the retainer elements 15b, the tip-end sections of the residual protrusions 22a do not come in contact with the portion that faces the tip-end sections of the residual protrusions 22a. Consequently, it is prevented that the tip-end sections of the residual protrusions 22a where sharp portions and burrs generated with shearing of the small cross-sectional area sections 17a exist come in contact with portions that face the residual protrusions 22a and localized wear at these areas of contact occurs, and also it is prevent that premature flaking of the rolling surfaces of the needles 6 and the outer raceway 4 and inner raceway 5 occurs due to wear fragments that are generated as wear occurs entering the areas of contact between the rolling surfaces of the needles 6 and the outer raceway 4 and inner raceway 5 and decreased strength occurs due to a reduction in the cross-sectional thickness of the column sections 10.

Second Example

Figure 5:
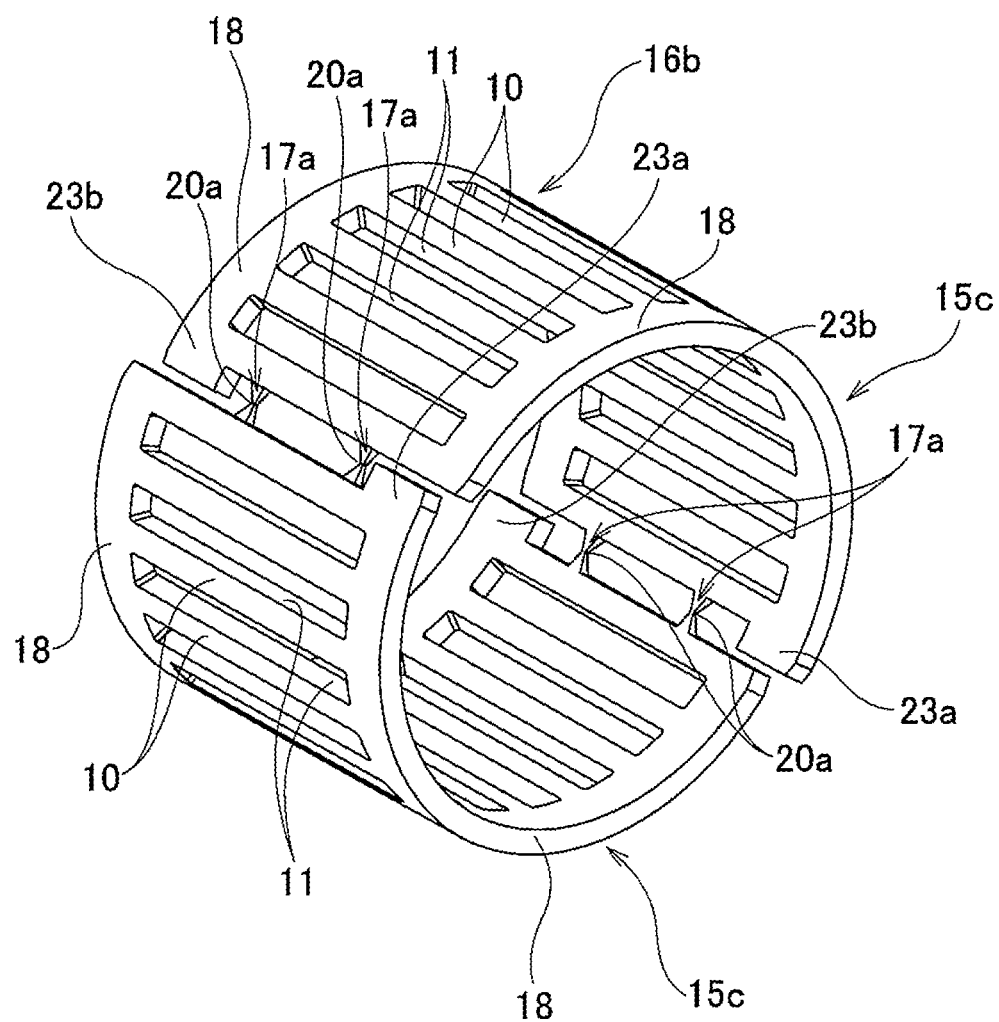
FIG. 5 is similar to FIG. 1, and illustrates a preliminary retainer of a second example of an embodiment of the present invention.
Figure 6:
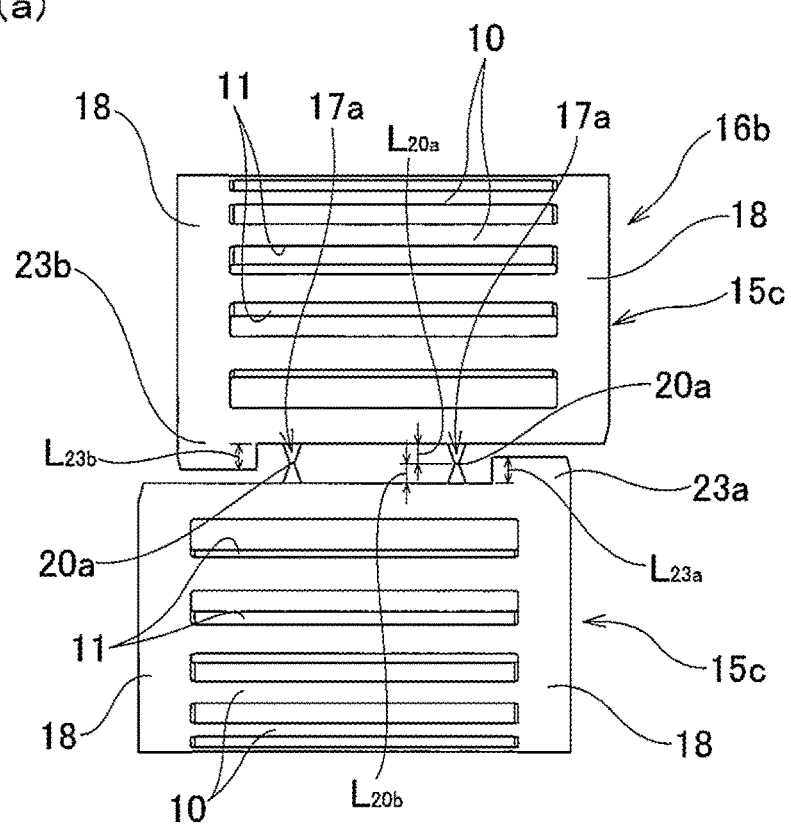
FIGS. 6A and 6B are similar to FIGS. 2A and 2B, and illustrate a connecting section between retainer elements of a preliminary retainer of the second example.
Figure 6:
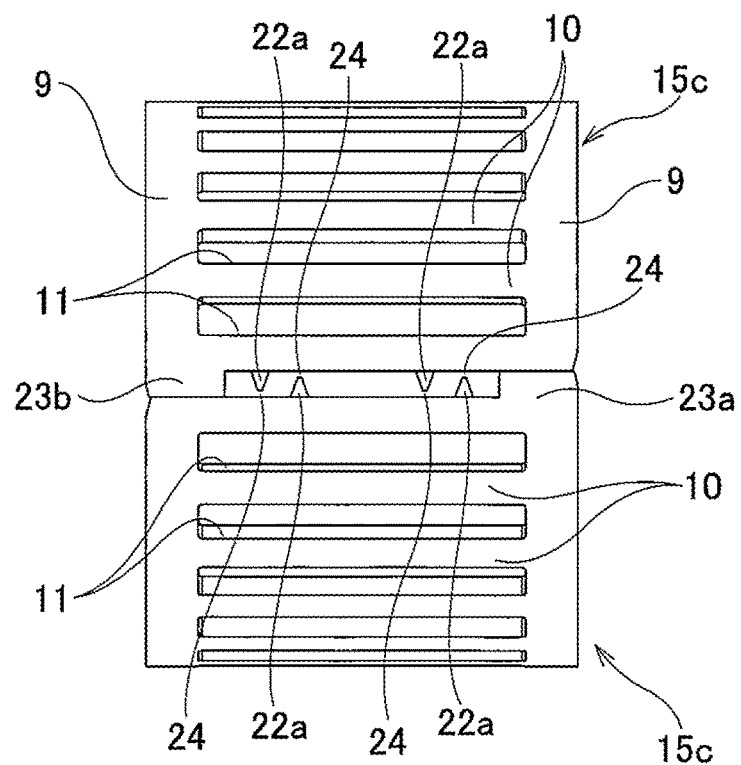

FIG. 5 and FIGS. 6A and 6B illustrate a second example of an embodiment of the present invention. In the preliminary retainer 16b of this example, convex sections 23a, the tip ends thereof being flat surfaces, that protrude in the circumferential direction are provided on one end section in the axial direction of one end surface in the circumferential direction of retainer elements 15c. Moreover, convex sections 23b, the tip ends thereof being flat surfaces, that protrude in the circumferential direction are provided on the end section in the axial direction of the other end surface in the circumferential direction of the retainer elements 15c. The amounts of protrusion $L_{23a}$, $L_{23b}$ in the circumferential direction of the convex sections 23a, 23b are the same as each other ($L_{23a}=L_{23b}$).

In this example, as illustrated in FIG. 6B, the dimensions of the small cross-sectional area sections 17a and convex sections 23a, 23b are regulated so that spaces 24 exist in the circumferential direction, in a state that the small cross-sectional area sections 17a shear at the shear guide sections 20a, the retainer elements 15c become aligned in the axial direction, and the tip-end sections of the convex sections 23a, 23b come in contact with the portions that face the tip-end sections of the convex sections 23a, 23b in the circumferential direction (end surfaces in the circumferential direction of the retainer elements 15c), between the tip-end sections of the residual protrusions 22a that remain on the end surfaces in the circumferential direction of the retainer elements 15c due to the shearing of the small cross-sectional area sections 17a, and the portions in the circumferential direction that face the residual protrusions 22a (end surfaces in the circumferential direction of the retainer elements 15c).

More specifically, when the dimension from one end section of the small cross-sectional area sections 17a to the shear guide sections 20 is taken to be $L_{20a}$, the dimension from the other end section of the small cross-sectional area sections 17a to the shear guide sections 20a is taken to be $L_{20b}$, and the dimension that is the larger of the dimensions $L_{20a}$ and $L_{20b}$ is taken to be $L_{20}$ (in this example, $L_{20}=L_{20a}=L_{20b}$), the dimensions of the small cross-sectional area sections 17a and convex sections 23a, 23b are regulated so that the protruding amounts $L_{23a}$, $L_{23b}$ in the circumferential direction of the convex sections 23a, 23b satisfy the relationship $L_{23a}$ ($L_{23b}$)>$L_{20}$. The construction and functions of the other parts are the same as in the first embodiment.

Third Embodiment

Figure 7:
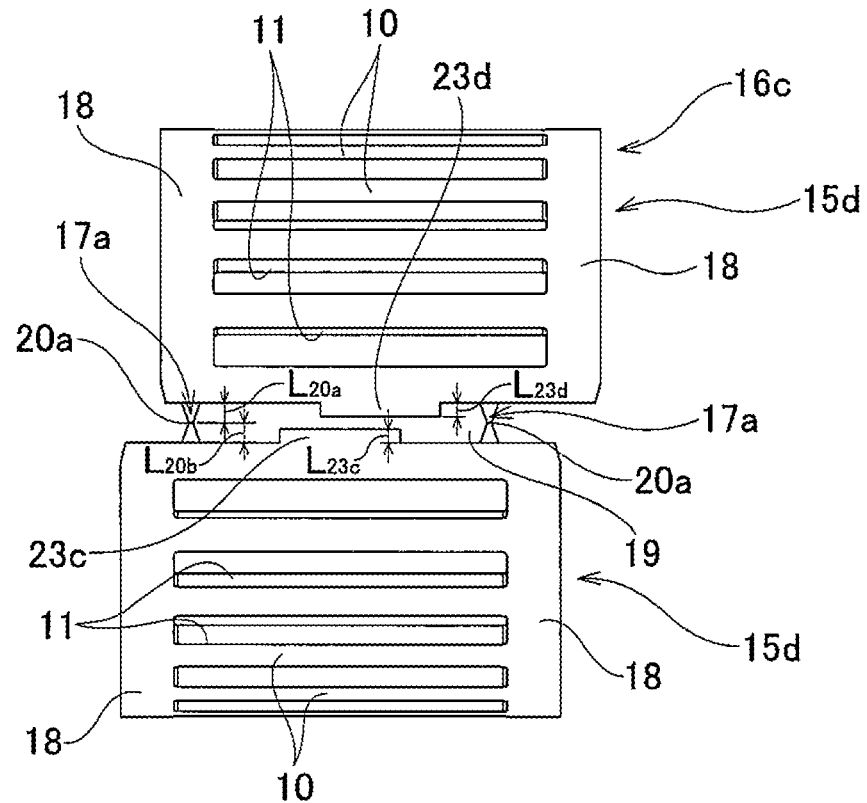
FIGS. 7A and 7B are similar to FIGS. 2A and 2B, and illustrate a connecting section between retainer elements of a preliminary retainer of a third example of an embodiment of the present invention.
Figure 7:
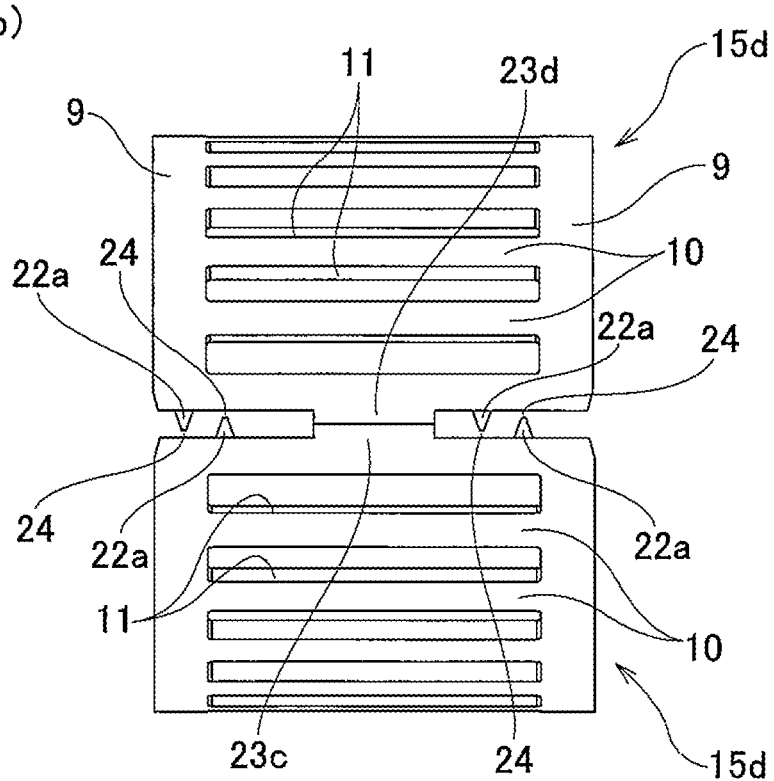

FIGS. 7A and 7B illustrate a third embodiment of the present invention. In the preliminary retainer 16c of this example, a convex section 23c (the tip end thereof being a flat surface) that protrudes in the circumferential direction is provided in the center section in the axial direction of one end surface in the circumferential direction of each of the retainer elements 15d. Moreover, a convex section 23d (the tip end thereof being a flat surface) that protrudes in the circumferential direction is also provided in the center section in the axial direction of the other end surface in the circumferential direction of each of the retainer elements 15d. The protruding amounts $L_{23c}$, $L_{23d}$ in the circumferential direction of these convex sections 23c, 23d are the same as each other ($L_{23c}=L_{23d}$), and are half the protruding amount $L_{23}$ of the convex sections 23 in the first embodiment ($L_{23c}=L_{23d}=(\frac{1}{2})\cdot L_{23}$). It is also possible for the protruding amounts $L_{23c}$, $L_{23d}$ of the convex sections 23c, 23d to be different from each other.

In this example as well, as illustrated in FIG. 7B, the dimensions of the small cross-sectional area sections 17a and the convex sections 23c, 23d are regulated so that spaces 24 exist in the circumferential direction, in a state that the small cross-sectional area sections 17a shear at the shear guide sections 20a, the retainer elements 15d become aligned with each other in the axial direction, and the tip-end sections of the convex sections 23c, 23d come in contact with each other in the circumferential direction, between the tip-end sections of the residual protrusions 22a that remain on the end surfaces in the circumferential direction of the retainer elements after shearing of the small cross-sectional area sections 17a, and the portions in the circumferential direction that face the tip-end sections of the residual protrusions 22a (end surfaces in the circumferential direction of the retainer elements 15d).

More specifically, when the dimension from one end section of the small cross-sectional area sections 17a to the shear guide sections 20a is taken to be $L_{20a}$, the dimension from the other end section to the small cross-sectional area sections 17a to the shear guide sections 20a is taken to be $L_{20b}$, and the dimension of the larger of the dimensions $L_{20a}$ and $L_{20b}$ is taken to be $L_{20}$ (in this example, $L_{20}=L_{20a}=L_{20b}$), the dimensions of the small cross-sectional area sections 17a and convex sections 23c, 23d are regulated so that the protruding amounts $L_{23c}$, $L_{23d}$ in the circumferential direction of the convex sections 23c, 23d satisfy the relationship $L_{23c}+L_{23d}>L_{20}$. The construction and functions of the other parts are the same as in the first example of an embodiment.

Fourth Embodiment

Figure 8:
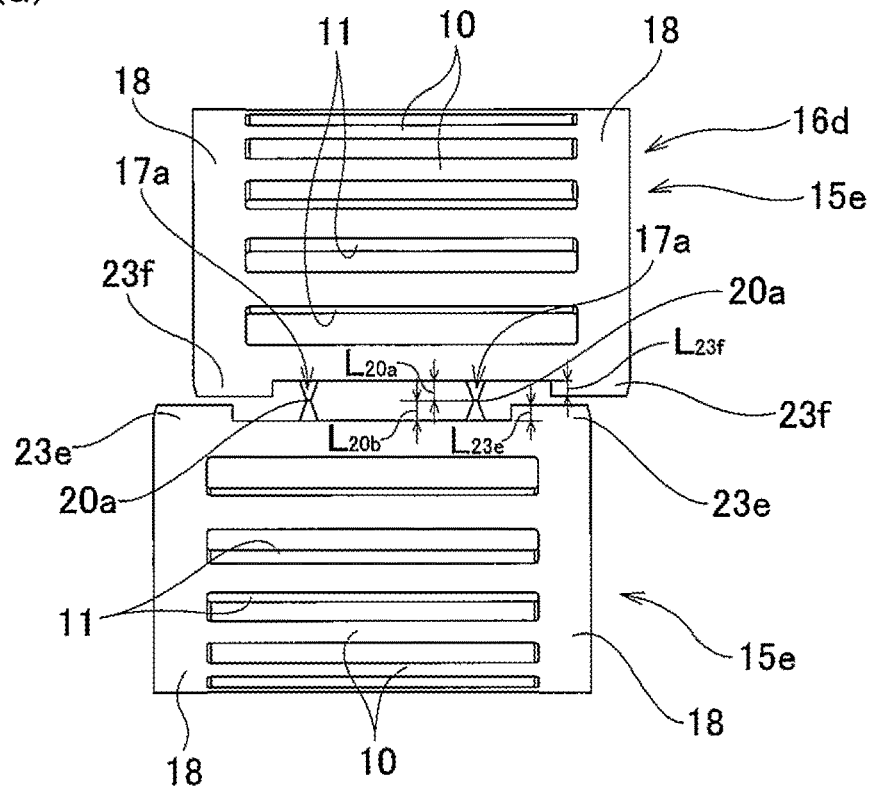
FIGS. 8A and 8B are similar to FIGS. 2A and 2B, and illustrate a connecting section between retainer elements of a preliminary retainer of a fourth example of an embodiment of the present invention.
Figure 8:
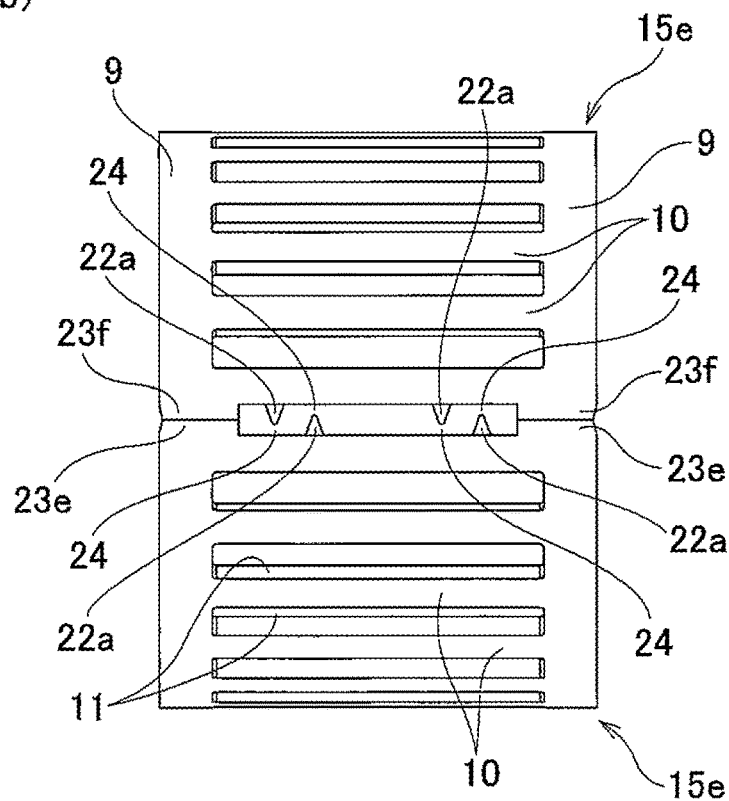

FIGS. 8A and 8B illustrate a fourth example of an embodiment of the present invention. In the preliminary retainer 16d of this example, convex sections 23e (the tip ends thereof being flat surfaces) that protrude in the circumferential direction are provided on both end sections in the axial direction of one end surface in the circumferential direction of the retainer elements 15e. Moreover, convex sections 23f (the tip ends thereof being flat surfaces) that protrude in the circumferential direction are provided on both end sections in the axial direction of the other end surface in the circumferential direction of the retainer elements 15e. The protruding amounts $L_{23e}$, $L_{23f}$ in the circumferential direction of these convex sections 23e, 23f are the same ($L_{23e}=L_{23f}$), and are ½ the protruding amounts $L_{23a}$, $L_{23b}$ of the convex sections 23a, 23b of the second embodiment ($L_{23e}=L_{23f}=(½) \cdot L_{23a}=(½) \cdot L_{23b}$). It is also possible for the protruding amounts $L_{23e}$, $L_{23f}$ of the convex sections 23e, 23f to be different from each other. However, in either case, it is necessary that the sum of the protruding amounts of the convex sections 23e, 23f in one direction in the axial direction be the same as the sum of the protruding amounts of the convex sections 23e, 23f in the other direction in the axial direction.

In this example as well, as illustrated in FIG. 8B, the dimensions of the small cross-sectional area sections 17a and convex sections 23e, 23f are regulated so that spaces 24 in the circumferential direction exist, in a state that the small cross-sectional area sections 17a shear at the shear guide sections 20a, the retainer elements 15e become aligned with each other in the axial direction, and the tip-end sections come in contact with each other in the circumferential direction, between the tip-end sections of residual protrusions 22a that remain on the end surfaces in the circumferential direction of the retainer elements due to shearing of the small cross-sectional area sections 17a, and portions in the circumferential direction that face the tip-end sections of the residual protrusions 22a (end surfaces in the circumferential direction of the retainer elements 15e).

More specifically, when the dimension from one end section of the small cross-sectional area sections 17a to the shear guide sections 20a is taken to be $L_{20a}$, the dimension from the other end section of the small cross-sectional area sections 17a to the shear guide sections 20a is taken to be $L_{20b}$, and the dimension of the larger of the dimensions $L_{20a}$ and $L_{20b}$ is taken to be $L_{20}$ (in this example, $L_{20}=L_{20a}=L_{20b}$), the dimensions of the small cross-sectional area sections 17a and the convex sections 23e, 23f are regulated so that $L_{20}$ and the protruding amounts $L_{23e}$, $L_{23f}$ in the circumferential direction of the convex sections 23e, 23f satisfy the relationship $L_{23e}+L_{23f}>L_{20}$. The construction and functions of the other parts are the same as in the second example of an embodiment.

When embodying the present invention, the shape or position of the convex sections that are provided on the end surfaces in the circumferential direction of the retainer elements are not limited by the construction of the first to fourth examples of an embodiment. As long as there is no conflict with each other, the construction of the examples of an embodiment can be suitably combined. Convex sections having various construction can be used as long as the condition is satisfied in that, there are spaces in the circumferential direction between the tip-end sections of the residual protrusions of the end surfaces in the circumferential direction of the retainer elements and the portions in the circumferential direction that face the tip-end sections of the residual protrusions, in a state that the small cross-sectional area sections shear at the shear guide sections, the retainer elements become aligned in the axial direction, and the tip-end sections of the convex sections come in contact with portions in the circumferential direction that face the tip-end sections of the convex sections.

INDUSTRIAL APPLICABILITY

The present invention is not limited to being applied to a manual transmission for an automobile, and can be widely applied to a radial needle bearing that is assembled in the rotation support section of various kinds of rotating mechanical apparatuses.

EXPLANATION OF REFERENCE NUMBERS 1, 1a Transmission gear
2, 2a Power transmission shaft
3 Radial needle bearing
4 Outer raceway
5 Inner raceway
6 Needle
7, 7a, 7b, 7c Retainer
8 Engaging teeth
9 Rim section
10 Column section
11 Pocket
12 Concave section
13, 13a Stepped section
14, 14a Synchronizing hub
15, 15a, 15b, 15c, 15d, 15e Retainer element
16, 16a, 16b, 16c, 16d Preliminary retainer
17, 17a, 17b, 17c Small cross-sectional area section
18 Raw rim section
19 Space
20, 20a, 20b, 20c Shear guide section
21a, 21b Synchronizer ring
22, 22a Residual protrusion
23, 23a, 23b, 23c, 23d, 23e, 23f Convex section
24 Space in the circumferential direction
25 Space in the axial direction

What is claimed is:

1. A preliminary retainer for a radial needle bearing, comprising plural retainer elements, each having a partial cylindrical shape;
each of the retainer elements comprising:
a pair of partial arc shaped raw rim sections provided on end sections in an axial direction; plural column sections spanning between the pair of raw rim sections; and plural pockets formed to be surrounded by the pair of raw rim sections and column sections of the plural column sections that are adjacent in a circumferential direction and holding needles so as to roll freely;
wherein
retainer elements of the plural retainer elements that are adjacent in the circumferential direction are arranged to be shifted in the axial direction, and edges of end sections in the circumferential direction of the retainer elements that are adjacent in the circumferential direction are connected together by small cross-sectional area sections;

shear guide sections having a cross-sectional area that is less than other portions of the small cross-sectional area sections are provided in part in the circumferential direction of the small cross-sectional area sections;

convex sections that protrude in the circumferential direction, tip-end surfaces of the convex sections being flat surfaces or smooth curved surfaces, are provided on at least one end surface of end surfaces that face each other of the retainer elements that are adjacent in the circumferential direction; and the small cross-sectional area sections and the convex sections are constructed so that when the small cross-sectional area sections shear at the shear guide sections, the retainer elements become aligned with each other in the axial direction, and the tip-end sections of the convex sections come in contact with portions in the circumferential direction that face the tip-end sections of the convex sections, spaces exist in the circumferential direction between tip-end sections of residual protrusions that remain on the end surfaces in the circumferential direction of the retainer elements after shearing of the small cross-sectional area sections and portions in the circumferential direction that face the tip-end sections of the residual protrusions.

2. The preliminary retainer for a radial needle bearing according to claim 1, wherein the shear guide sections are formed in a center in the circumferential direction of the small cross-sectional area sections.

3. The preliminary retainer for a radial needle bearing according to claim 1, wherein when the small cross-sectional area sections shear at the shear guide sections, the retainer elements become aligned with each other in the axial direction, and the tip-end sections of the convex sections come in contact with the portions in the circumferential direction that face the tip-end sections of the convex sections, spaces exist in the axial direction between the convex sections and the residual protrusions on the end surfaces in the circumferential direction of the retainer elements that are on sides that face the convex sections.

* * * * *